Patented Feb. 15, 1938

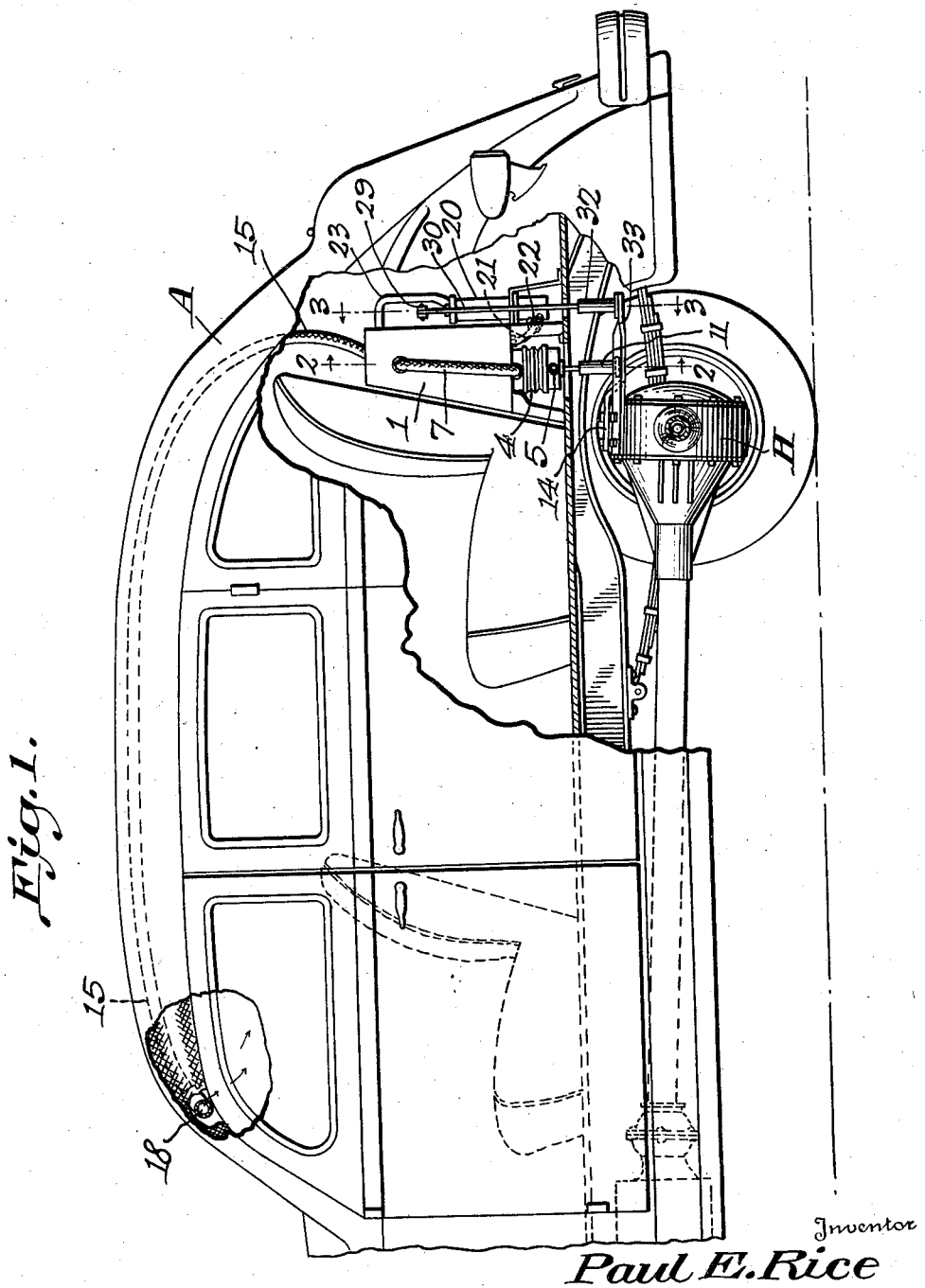

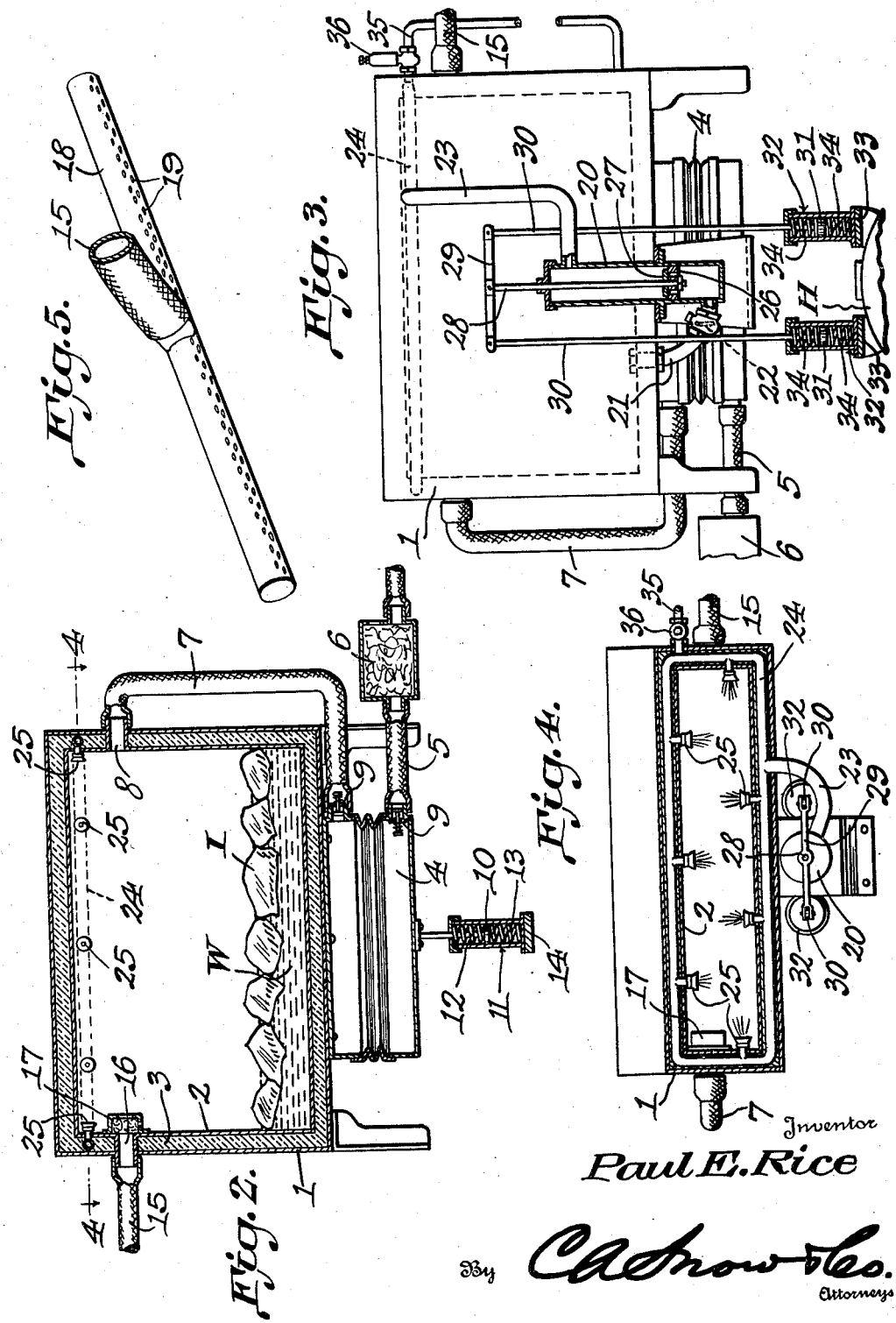

2,108,391

UNITED STATES PATENT OFFICE 2,108,391

AIR CONDITIONER FOR MOTOR VEHICLES

Paul E. Rice, Lincoln, Nebr.

Application December 19, 1936, Serial No. 116,811

2 Claims. (Cl. 261—29)

This invention relates to an air conditioner for motor vehicles of the closed body types, an object of the invention being to provide an apparatus which can be stored readily in the body portion of the car and operates to filter, cool, dehumidify and circulate the air, the power required for setting up the air circulation being obtained from the movement of the vehicle body relative to the running gear, the same relative movement being utilized for washing the air as it is circulated through the apparatus.

A further object is to provide mechanism of this character which is simple, durable and efficient and can be installed readily in vehicles already constructed although it is to be understood that, if desired, the apparatus can be built into the vehicles at the time of manufacture.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawings the preferred form of the invention has been shown.

In said drawings:

Figure 1 is a view partly in elevation and partly in section of a portion of a motor vehicle equipped with the present improvements.

Figure 2 is an enlarged section through the apparatus taken on line 2—2, Figure 1.

Figure 3 is a section through the apparatus taken on line 3—3, Figure 1.

Figure 4 is a section taken on line 4—4, Figure 2.

Figure 5 is a perspective view of the air disseminating nozzle.

The invention includes a conditioning tank 1 which can be so shaped and proportioned as to be stored readily in any convenient part of the motor vehicle a portion of the body of which has been indicated at A. In the structure shown this tank has been placed behind the back seat. The tank is suitably lined, as shown at 2, there being an insulating material 3 between this lining and the wall of the tank. The tank is adapted to hold ice and water to be used for chilling the air and washing it but it is to be understood that instead of employing ice, any other suitable chilling means may be used. In the drawings the ice has been indicated at I and the water at W.

For the purpose of setting up a circulation of air through the conditioning tank, there is provided an air pump of any suitable construction adapted to be actuated by the movement of the vehicle body relative to the running gear of the vehicle. For example, and as shown in the drawings, a pump in the form of a bellows 4 can be located under and secured to the tank, this bellows being provided with an intake tube 5 adapted to draw fresh air through a filter 6 while an outflow tube 7 extends from the bellows to a port 8 in the upper portion of the tank 1. Both of these tubes can be provided with check valves 9 for the purpose of preventing return flow of air.

To the bottom or movable head of the bellows is attached a piston 10 which works within a cylinder 11 between cushioning springs 12 and 13. This cylinder is mounted on a support 14 which, in the present instance, is an arm fixedly attached to and extending from the housing H of the differential forming a part of the running gear of the vehicle. Thus it will be seen that while the vehicle is in motion and the body A is moving upwardly and downwardly relative to the running gear, because of the resiliency of the springs of the vehicle, the bellows 4 will be expanded and contracted so that air will be drawn through filter 6 into the bellows and then expelled through tube 7 and port 8 into the tank 1. An outlet tube 15 extends from an outlet port 16 in the tank and this port can be covered by a separator 17 consisting of copper shavings or the like housed within a foraminous holder.

The tube 15 is extended to any suitable point in the body of the vehicle where the treated air is to be directed into the vehicle. At that point the tube is attached to an elongated nozzle 18 having a plurality of small outlets 19. Thus air delivered into tube 15 will flow outwardly through these small outlets and into the vehicle.

The means thus far described operate solely to set up a circulation of air and to cool the air while flowing through the tank 1 containing the refrigerant. Additional means are supplied not only for chilling the air but also for washing it. This means includes a pump of any suitable construction likewise actuated by the movement of the body relative to the running gear. While various kinds of pumps might be used, the one shown in the drawings includes a cylinder 20 the lower end of which communicates with the bottom of tank 1 through a tube 21 which can be provided with a check valve 22 designed to prevent return flow. Extending from the upper portion of the cylinder is an outflow tube 23 opening into a distributing pipe 24 which is extended around the interior of tank 1 adjacent to the top thereof and has outlet spraying nozzles 25 arranged at desired intervals and adapted to direct finely divided water into the upper portion of tank 1 so that it will mix with the circulating air and not only wash it but also chill it.

A piston 26 is mounted for reciprocation in the cylinder 20 and can be provided with a suitable check valve 27 so that the piston when moved upwardly will act to lift water and expel it through tube 23 into distributing pipe 24 and thence to the spraying nozzles. This piston is connected by a rod 28 to a cross-head 29 having connecting rods 30 extending downwardly therefrom to pistons 31 mounted in cylinders 32. The cylinders are secured to suitable supports which, in the present instance, are in the form of rigid arms 33 secured to and extending from a portion of the running gear, such as the housing H of the differential. Springs 34 are arranged in each cylinder above and below the pistons and act as cushions.

It will be apparent that during the relative movement of the body and running gear, the motion will be transmitted through the springs 34 to the pistons 31 which, in turn, will operate the connecting rods 30 to reciprocate cross-head 29 and cause the pump piston 26 to reciprocate. Consequently chilled water will be withdrawn from the bottom of the tank by this pump and lifted forcibly so as to be expelled through tube or pipe 23 to distributing pipe 24 and thence to the spraying nozzles 25. As a result the air will be chilled and washed and as it leaves the tank 1 through port 16, excess moisture will be removed therefrom by the separator 17. Thus the air, when delivered into the vehicle body, will be chilled and washed and will be free from an excessive amount of moisture.

To prevent the building up of excessive pressure in the tank, an overflow pipe 35 may be extended from the distributing pipe 24, this overflow pipe being provided with a release valve 36. The overflow pipe 35 can be extended to any point desired. For example it could be extended to a radiator within the car body from which the overflow water could be returned to the tank 1. Thus an added means for cooling the interior of the car would be provided. Such a construction is so obvious that a detailed description or illustration thereof is not deemed necessary.

What is claimed is:

1. The combination with the running gear of a vehicle and a body yieldingly supported thereon, of a container, an air filter, an air outlet device within the body and in communication with the container, said container constituting means for holding water and a refrigerant, and means operated by the relative movement of the body and running gear for drawing air through the filter and forcing it through the container to the outlet means within the body, and additional means operated by the relative movement of the body and running gear for withdrawing water from the container and directing it onto the air circulating within the container, said last mentioned means including a pump having relatively movable members connected to the running gear and body respectively, a tube leading to the pump from the bottom portion of the container, spraying nozzles within the container, and a tubular connection between the pump and the spraying nozzles.

2. The combination with the running gear of a vehicle and a body yieldingly supported thereon, of a container carried by the body for holding a chilling liquid, said container having an air inlet and an air outlet, an air filter having an inlet, and means operated by the relative movement of the body and running gear for drawing air through the filter and forcing it upwardly to the air inlet of the container and thence through the container to the outlet and thence into the body, the distance between said air inlet and outlet of the container being equal to the length of the surface of the chilling liquid in the container whereby the temperature of the air is reduced by the chilling liquid throughout the movement of the air from said inlet to the outlet.

PAUL E. RICE.